United States Patent

[11] 3,612,858

[72] Inventor Theodore De Parry
Elmhurst, Ill.
[21] Appl. No. 10,174
[22] Filed Feb. 10, 1970
[45] Patented Oct. 12, 1971
[73] Assignee The United States of America as
represented by the United States Atomic
Energy Commission

[54] DEVICE FOR MEASURING THE POSITION, SIZE AND INTENSITY OF HIGH-ENERGY PARTICLES
6 Claims, 3 Drawing Figs.
[52] U.S. Cl. .................................................. 250/41.95 R,
250/49.5 R, 250/83 R, 324/71 EB
[51] Int. Cl. ............................................ G01t 1/00,
H01j 39/04
[50] Field of Search ...................................... 250/49.5 R,
41.9 G, 41.9 D, 41.9 SR; 324/71 EB

[56] References Cited
UNITED STATES PATENTS
2,814,730 11/1957 Fechter ........................ 250/49.5 R Primary Examiner—James W. Lawrence
Assistant Examiner—C. E. Church
Attorney—Roland A. Anderson ABSTRACT: A particle beam position monitor includes first and second pairs of plates mounted normal with respect to the longitudinal axis of the particle beam on opposite sides thereof. The associated plates of each of the first and second pairs are fixedly spatially mounted with respect to each other and each have one edge positioned to lie in a single plane parallel to the longitudinal axis of the particle beam. A pair of voltage sources are connected to produce potentials between the associated plates of the first and second pairs respectively and a pair of electrometers measure secondary electron emission from the pairs of plates in the presence of the particle beam. A bridge circuit differentially combines the measured secondary electron emission to provide a relative measure of the position of the particle beam.

PATENTED OCT 12 1971 3,612,858

Inventor
Theodore de Parry
Attorney

DEVICE FOR MEASURING THE POSITION, SIZE AND INTENSITY OF HIGH-ENERGY PARTICLES

CONTRACTUAL ORIGIN OF THE INVENTION

The invention described herein was made in the course of, or under, a contract with the United Stated Atomic Energy Commission.

BACKGROUND OF THE INVENTION

This invention relates to a particle beam monitor and more particularly to a monitor capable of measuring the position, size, and intensity of a beam of high-energy particles.

In addition to measuring the intensity of a high-energy particle beam, it is generally requisite that the position of the beam be determined with respect to some reference point or that the cross-sectional dimensions of the beam be known. To accomplish these measurements, separate apparatuses are needed whereby a complex system of instrumentation is necessitated to obtain the required data.

Further, one of the major disadvantages of most beam position monitors now in use is a nonlinear signal response. This problem is reduced only by careful calibration of the monitor. Also, position readings are affected by changes in environment, such as temperature, pressure, and humidity. These changes require either recalibration of the position monitor or strict control of environmental conditions, both costly and time-consuming procedures.

It is therefore one object of the present invention to provide a single apparatus capable of measuring the position, size and intensity of a beam of high-energy particles.

It is another object of the present invention to provide a simple and accurate means for determining nondestructively the position of a high-energy particle beam.

It is another object of the present invention to provide a particle beam position monitor having a linear response signal and which is independent of environmental conditions.

Other objects of the present invention will become more apparent as the detailed description proceeds.

SUMMARY OF THE INVENTION

In general, the particle beam monitor of the present invention comprises first and second pairs of plates mounted normal with respect to the longitudinal axis of the particle beam on opposite sides thereof to intercept the beam. The associated plates of each of the first and second pairs are fixedly spatially mounted with respect to each other and means are provided for detecting secondary electron emission from each of the first and second pairs of plates in the presence of the particle beam. Means are further provided for combining the detected secondary electron emissions from the first and second plate pairs of plates to provide a measure of the particle beam.

BRIEF DESCRIPTION OF THE DRAWINGS

Further understanding of the present invention may be best obtained from consideration of the accompanying drawings wherein:

Referring to FIGS. 1 and 2, first and second pairs of like plates 10 and 12 are mounted normal to and on opposite sides of the longitudinal axis of a particle beam 14. The plates 10 and 12 in each of the pairs are thin metal plates, semicircular in shape, and fixedly spatially mounted with respect to each other, the separation between the plates 10 of the first pair being equal to the separation between the plates 12 of the second pair. The plates 10 and 12 are positioned so that the straight edge 16 of each of the plates lies in a common plane which is parallel to the longitudinal axis of the particle beam 14. Each of the plates 10 and 12 in the pairs lies in a unique plane normal to the longitudinal axis of the beam 14.

Figure 1:
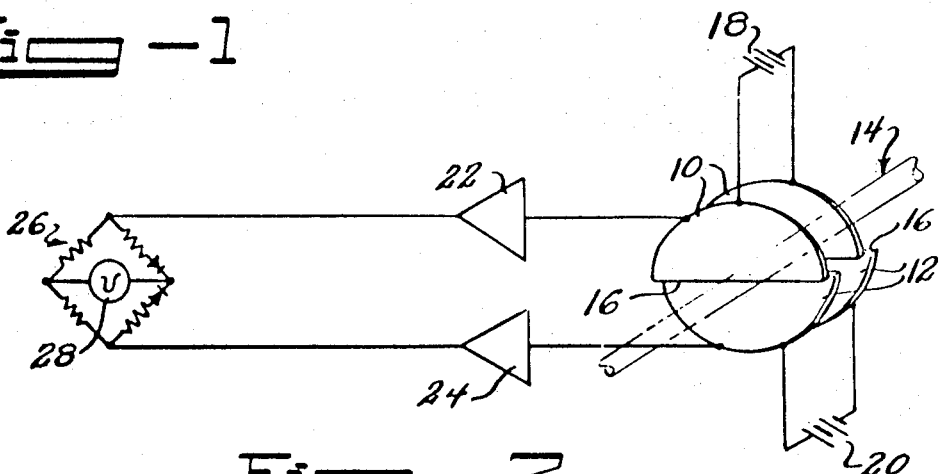
FIG. 1 is a schematic diagram of an apparatus constructed for the practice of the present invention.

A pair of voltage sources 18 and 20 are connected across the associated plates 10 and 12 of the first and second pairs respectively to provide like potentials therebetween. The potential between plates 10 and the potential between the plates 12 are such as to generate between the respective associated plates in each of the pairs like electric fields in strength and direction. An electrometer 22 is connected to the first pair of plates 10 and an electrometer 24 is connected to the second pair of plates 12 to measure the respective potentials therebetween. The outputs from electrometers 22 and 24 are connected to the input terminals of a bridge circuit 26 as shown. A voltmeter 28 is connected across the output of the bridge circuit 26.

In operation, a potential is applied by means of the voltage sources 18 and 20 across the associated plates 10 and 12 in each of the first and second pairs to create like electric fields in sense and value between each of the associated plates 10 and between each of the associated plates 12. When the plates 10 and 12 are placed in the path of the particle beam 14, secondary electrons are emitted due to the impact of the high-energy beam with the plates 10 and 12. Because of the electric field between the associated plates in each pair, the negatively charged secondary electrons are attracted to the positive plate in each of the pairs. This accumulation of secondary electrons on the positive plates produces a change in the potential between the associated plates 10 and between the associated plates 12. The electrometers 22 and 24 detect the potential between the associated plates 10 and between associated plates 12, respectively and hence measure any change therein. The bridge circuit 26 differentially combines the signals from the electrometers 22 and 24.

Since the number of secondary electrons emitted from a pair of plates is related to the number of particles in the beam striking the plate and thus to the portion of the total cross-sectional area of the beam passing through the plates, the differentially combined output signal of the bridge circuit 26 is a relative measure of the position of the particle beam with respect to the straight edge 16 of the pairs of plates 10 and 12. As the longitudinal axis of the beam 14 is altered with respect to the pairs of plates 10 and 12, the portion of the cross-sectional area of the beam 14 passing through the plates changes to produce a corresponding change in the secondary electron emission from the plates. When a beam position is reached where equal portions of the beam 14 pass through each of the pairs of plates 10 and 12, the secondary electron emission measured by each of the electrometers 22 and 24 is equal and a null reading is obtained on the output of voltmeter 28 across the bridge circuit 24. Thus, as the longitudinal axis of the beam departs from this null reading, unbalance in the output of the electrometers 22 and 24 will be effected, which unbalance is indicative of the direction and the amount of motion of the beam from the null position. With the embodiment of FIG. 1, it is readily apparent that the two pairs of plates 10 and 12 give beam motion readings in the Y direction. With an additional apparatus like the embodiment of FIG. 1 having the plates thereof oriented so that their edges lie in a plane parallel to the longitudinal axis of the beam 14 and normal to the plane in which edges 16 lie, motion and position of the beam 14 may be detected in the X direction.

To minimize beam interference and enable nondestructive position monotoring, the plates 10 and 12 are preferably constructed of a metal of low density whereby the energy loss of the beam 14 is minimized. Aluminum, gold and silver have been found to be acceptable materials for the plates 10 and 12. Further, the plates 10 and 12 are preferably made to be as thin as possible. Aluminum plates having a thickness of 0.00127 cm. have been successfully used. It will be appreciated that the plates 10 and 12 may be shaped other than semicircular for the successful practice of the present invention. For example they may be rectangular in shape.

The potential applied between the associated plates 10 and between associated plates 12 is not critical in the practice of the present invention. However, it is desired that the potential be sufficient to attract the secondary electrons to the positive plates of each of the pairs. Potential gradients of 150 volts/cm. or greater have been found satisfactory. As previously stated, the plates 10 and 12 for the practice of the present invention should be of like material and like dimensions with equal separation between the associated plates in each pair.

It will be appreciated that the apparatus of FIG. 1 can be used to measure the cross-sectional dimensions of the particle beam 14. This may be accomplished in the following manner. As the position of the plates 10 and 12 is varied with respect to the longitudinal axis of the particle beam 14, a position will be reached where the perimeter of the beam corresponds to the straight edge 16 of the pairs of plates 10 and 12 and the beam 14 passes only through one pair of plates. In such a situation, the secondary emission from the pair of plates through which the beam passes is at a maximum, while the secondary emission from other pair of plates is at a minimum. By moving the plates 10 and 12 along a line perpendicular to both the longitudinal axis of the beam 14 and straight edge 16 of the pairs of plates 10 and 12, a position will be reached where the opposite point on the perimeter of the beam 14 corresponds to the straight edge 16 and the beam 14 passes only through the other pair of plates. In this situation, the maxima and the minima output signals from the electrometers 22 and 24 are reversed. By monitoring the changes from maxima to minima in the output signals and determining the distance that the pairs of plates 10 and 12 were moved to obtain the maxima and minima signal changes, the measurement of the diameter of the cross-sectional area of the beam 14 may be accomplished.

Figure 2:
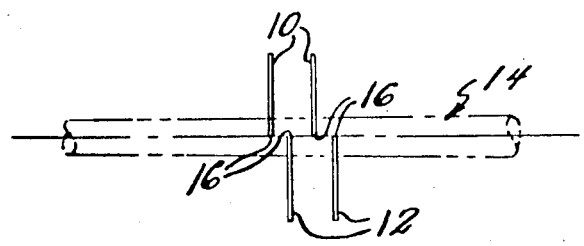
FIG. 2 is a side view of the plates of the apparatus of FIG. 1 showing their alignment with respect to the longitudinal axis of a particle beam.
Figure 3:
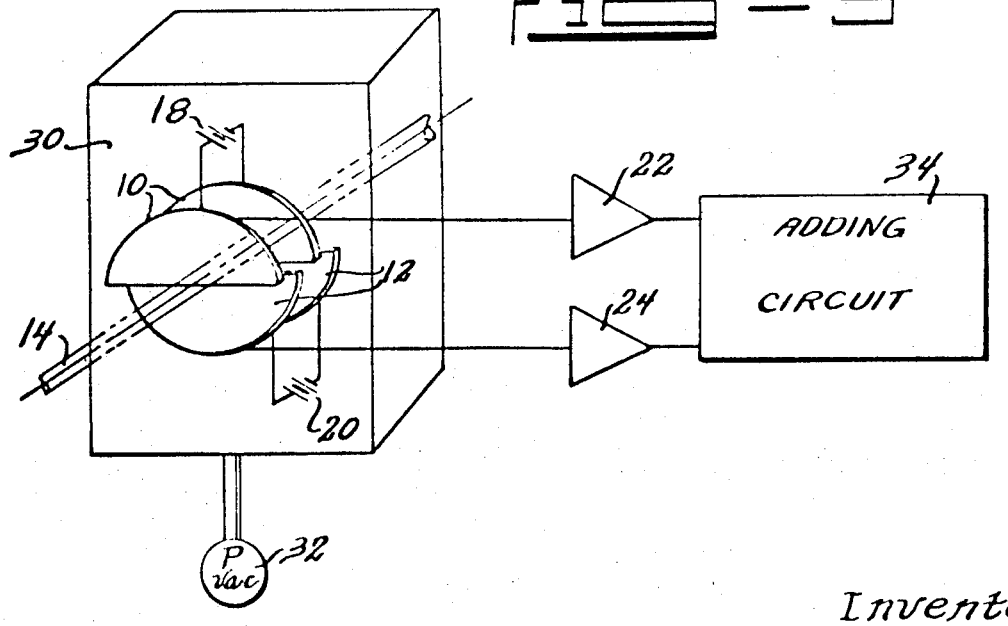
FIG. 3 is a schematic diagram of the apparatus of FIG. 1 modified to measure particle beam intensity according to the present invention.

The apparatus of FIGS. 1 and 2 may be modified to permit the measure of the intensity of the beam 14. Such a modification is illustrated in FIG. 3. For beam intensity measurements, the plates 10 and 12 should be enclosed in a container 30 which is partially evacuated by a vacuum pump 32. Further, the measured signals from the electrometers 22 and 24 are additively combined in circuit 34. As the particle beam 14 passes through the pairs of plates 10 and 12, the secondary electron emission therefrom is a relative measure of the intensity of the beam. Thus, the summing of the output of electrometers 22 and 24 provides a measure of the total of the secondary electron emission produced by the beam as it passes through the pairs of plates 10 and 12 and hence a relative measure of the beam intensity.

A beam position monitor constructed according to the aforedescribed teachings produces a linear response signal which is independent of environmental conditions and provides a simple and accurate means for determining beam position, intensity, and cross-sectional dimensions.

Persons skilled in the art will, of course, readily adapt the teachings of the present invention to embodiments far different from the embodiments illustrated and described in the application. Accordingly, the scope of the present invention should be limited only in accordance with the appended claims.

The embodiments of the invention in which an exclusive property or privilege is claimed are defined as follows:

1. A particle beam monitor comprising first and second pairs of plates mounted normal with respect to the longitudinal axis of said beam on opposite sides thereof to intercept said beam, the associated plates of each of said first and second pairs being fixedly spatially mounted with respect to each other, means for detecting secondary electron emission from each of said first and second pairs of plates in the presence of said particle beam, and means for combining the detected secondary electron emissions from said first and second plate pairs to provide a measure of said particle beam.

2. The apparatus according to claim 1 wherein the associated plates of each of said first and second pairs are fixedly spatially mounted relative to each other and normal to the longitudinal axis of said beam and each plate of said first and second pairs has an edge positioned to lie in a single plane parallel to the longitudinal axis of said particle beam.

3. The apparatus according to claim 2 wherein said secondary electron emission-detecting means and said detected secondary electron emission combining means comprise means for applying a potential between associated plates in each of said first and second pairs, means for measuring the secondary electron emission from each of said first and second pairs of plates in the presence of said particle beam, a means for differentially combining the measured secondary electron emission from said first and second plate pairs to provide a measure of the position of said particle beam.

4. The apparatus according to claim 2 further including housing means disposed about said pairs of plates transparent to said particle beam, and means for evacuating said housing means to provide a partial vacuum about said pairs of plates, and wherein said secondary electron emission detecting means and said detected secondary electron emission combining means comprise means for applying a potential between associated plates in each of said first and second pairs, means for measuring the secondary electron emission from each of said first and second pairs of plates in the presence of said particle beam, and means for additively combining the measured secondary electron emission from said first and second plate pairs to provide a measure of the intensity of said particle beam.

5. A particle beam monitor comprising two pair of like plates spatially fixedly mounted with respect to each other on opposite sides of a plane normal to the plates with an edge of each of said plates lying in said plane, said plane lying along the longitudinal axis of said particle beam parallel thereto, means for generating a potential between the plates in each of said pairs, electrometer means for measuring the potential between plates in each of said pairs in the presence of said particle beam, and means for differentially combining said measured potentials to provide a measure of the position of said particle beam.

6. The apparatus according to claim 5 further including evacuative means about said plates to provide a partial vacuum therefor, and wherein said means additively combines the measured potentials between the plates in each of said pairs to provide a measure of the intensity of said beam.